(12) United States Patent
Weber, III et al.

(10) Patent No.: US 7,874,690 B2
(45) Date of Patent: Jan. 25, 2011

(54) LED LIGHTING FIXTURE FOR ILLUMINATING A CAVITY

(75) Inventors: Ronald Martin Weber, III, Annville, PA (US); Charles Raymond Gingrich, III, Mechanicsburg, PA (US)

(73) Assignee: Tyco Electronics Corporation, Berwyn, PA (US)

(*) Notice: Subject to any disclaimer, the term of this patent is extended or adjusted under 35 U.S.C. 154(b) by 156 days.

(21) Appl. No.: 12/144,949

(22) Filed: Jun. 24, 2008

(65) Prior Publication Data
US 2009/0316385 A1    Dec. 24, 2009

(51) Int. Cl.
*F21V 8/00* (2006.01)
*F21V 33/00* (2006.01)

(52) U.S. Cl. .................. 362/92; 362/558; 362/560; 219/220

(58) Field of Classification Search .......... 362/92, 362/310, 294, 555, 551, 558, 559, 560; 126/213; 219/220, 758
See application file for complete search history.

(56) References Cited

U.S. PATENT DOCUMENTS

| | | | | |
|---|---|---|---|---|
| 2,526,226 | A * | 10/1950 | Gross | 219/758 |
| 7,109,450 | B2 * | 9/2006 | Kaji et al. | 219/620 |
| 2001/0033484 | A1 * | 10/2001 | Gilley | 362/92 |
| 2004/0041984 | A1 * | 3/2004 | Tani et al. | 353/20 |
| 2004/0264168 | A1 * | 12/2004 | Gotz et al. | 362/92 |
| 2007/0025119 | A1 | 2/2007 | Chang-Jien et al. | |
| 2007/0064418 | A1 * | 3/2007 | Huang et al. | 362/231 |
| 2007/0241653 | A1 | 10/2007 | Chou | |
| 2008/0037280 | A1 | 2/2008 | Sheng | |
| 2009/0071463 | A1 * | 3/2009 | Ebert et al. | 126/273 R |

FOREIGN PATENT DOCUMENTS

| | | |
|---|---|---|
| DE | 41 00 605 | 7/1992 |
| DE | 103 01 078 | 7/2004 |
| DE | 20 2005 010781 | 11/2006 |
| DE | 10 2006 061739 | 7/2008 |
| DE | 10 2007 015237 | 10/2008 |
| EP | 0 922 910 | 6/1999 |
| EP | 1 598 682 | 11/2005 |
| WO | WO 03/060580 | 7/2003 |

OTHER PUBLICATIONS

International Search Report, International Application No. PCT US2009/003709, International Filing Date, Jun. 22, 2009.

* cited by examiner

*Primary Examiner*—Thomas M Sember

(57) ABSTRACT

An oven lighting fixture includes an LED assembly or assemblies optically coupled with an optical guide member. The lighting fixture also includes a mounting bracket and a pair of electrical leadwires to connect the LED lighting fixture to an external voltage source. The LED assembly has an LED attached to a printed circuit board containing ancillary circuitry for powering the LED, and a heat sink for removing heat from the LED. The mounting bracket is attachable to a door of the oven cavity to support the LED lighting fixture adjacent to a sidelight window. The mounting bracket has a slot adjacent to the window for transmitting light from the LED through the light guide and into the oven cavity. Positioning the lighting fixture outside of the oven cavity and adjacent to the sidelight window permits the LED to operate within required temperature limits.

6 Claims, 6 Drawing Sheets

LED LIGHTING FIXTURE FOR ILLUMINATING A CAVITY

BACKGROUND

The present application generally relates to a light-emitting diode (LED) lighting fixture. The application relates more specifically to an LED lighting fixture for illuminating an oven cavity or other adverse environment.

Prior art residential and commercial ovens typically include incandescent or halogen light bulbs for illuminating an oven cavity. Oven temperatures for commercial and residential ovens are frequently used in excess of 250° C. LEDs provide an intense point source of light that would provide improved lighting and energy efficiency in an oven cavity over the traditional style incandescent and halogen bulbs. However, LEDs have not been used for lighting in such environments, as most commercially available LEDs cannot function properly at junction temperatures above 125° C.

Similarly, other enclosed spaces where illumination is required are located in adverse environments that would destroy existing light bulbs and fixtures. Such adverse environments vary in their character, and may include toxic chemical or gas tanks, radioactive containments, acidic, poisonous or explosive liquid or gas containers, and similar corrosive and uninhabitable areas.

Therefore, there is a need for a device and method that permits the use of LED illumination for an oven cavity or adverse environment, while operating the LED within the normal temperature rating of the LED, and which further prevents the LED from exposure to corrosive or destructive environments.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to an LED type lighting fixture for illuminating a cavity. The lighting fixture includes an LED assembly, an optical guide member optically coupled with the LED assembly, and a cap portion with an aperture at one end for receiving the optical guide member. The cap portion is arranged to direct light emitted from an LED mounted in the LED assembly into the optical guide member and secure the optical guide member to the LED. The optical guide has an exterior surface and a reflective strip applied to a portion of the exterior surface of the optical guide for reflecting a light beam emitted from the LED in a predetermined direction.

Another embodiment relates to an LED type lighting fixture for illuminating an oven cavity. The lighting fixture includes an LED assembly optically coupled with an optical guide member, a mounting bracket and a pair of electrical leadwires to connect the LED lighting fixture to an external voltage source. The LED assembly includes an LED attached to a printed circuit board, and a heat sink for removing heat from the LED. The mounting bracket is attachable to a planar surface adjacent to an oven cavity to support the LED lighting fixture adjacent to a sidelight window, the mounting bracket partially surrounding the lighting fixture and having a slot adjacent to the window for transmitting light from the LED through the light guide and into the oven cavity.

Certain advantages of the embodiments described herein are reduced energy consumption, longer lumen life and increased lighting for an oven cavity light fixture.

Alternative exemplary embodiments relate to other features and combinations of features as may be generally recited in the claims.

DETAILED DESCRIPTION OF THE EXEMPLARY EMBODIMENTS

Figure 1:
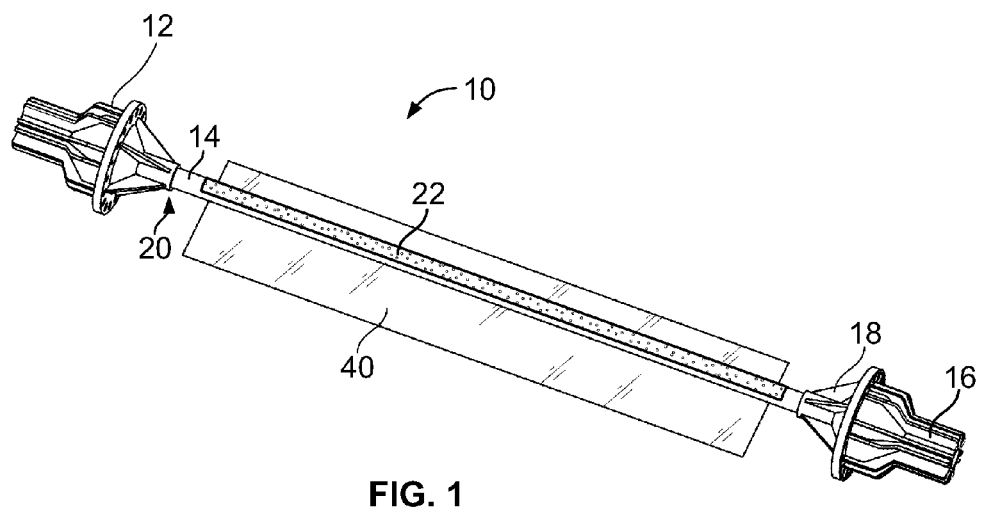
FIG. 1 is a perspective view of one embodiment of an LED light fixture of the present invention.
Figure 4:
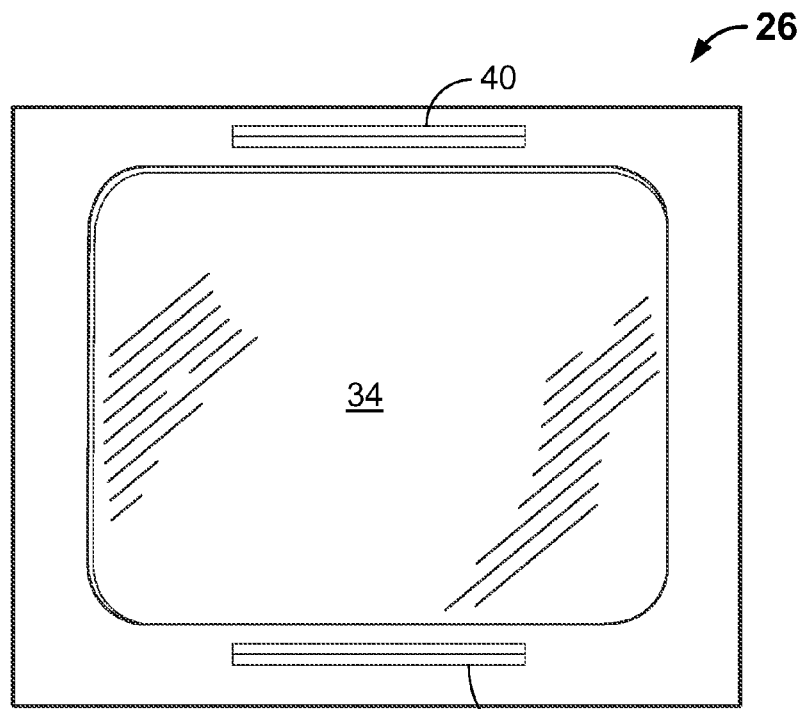
FIG. 4 is an elevational view of the oven door panel of FIG. 2 taken from the interior of an oven cavity.
Figure 6:
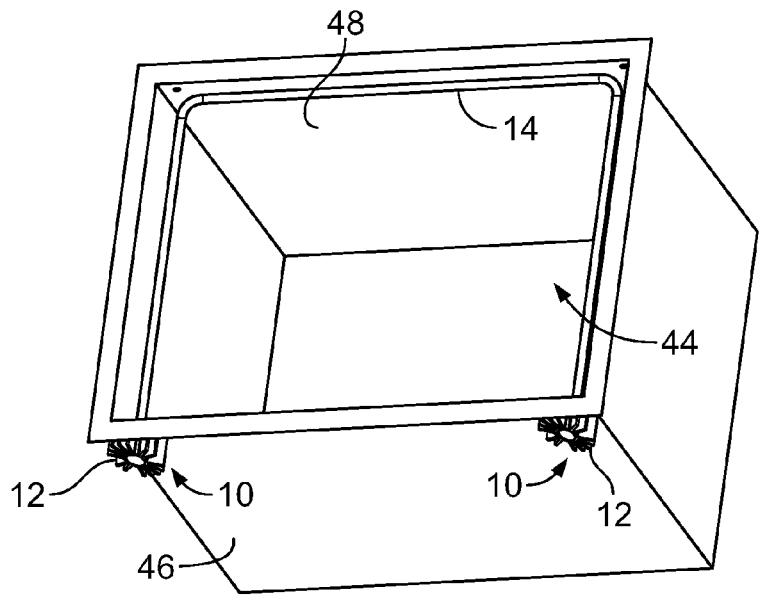
FIG. 6 illustrates an alternate embodiment of the light guide assembly.
Figure 7:
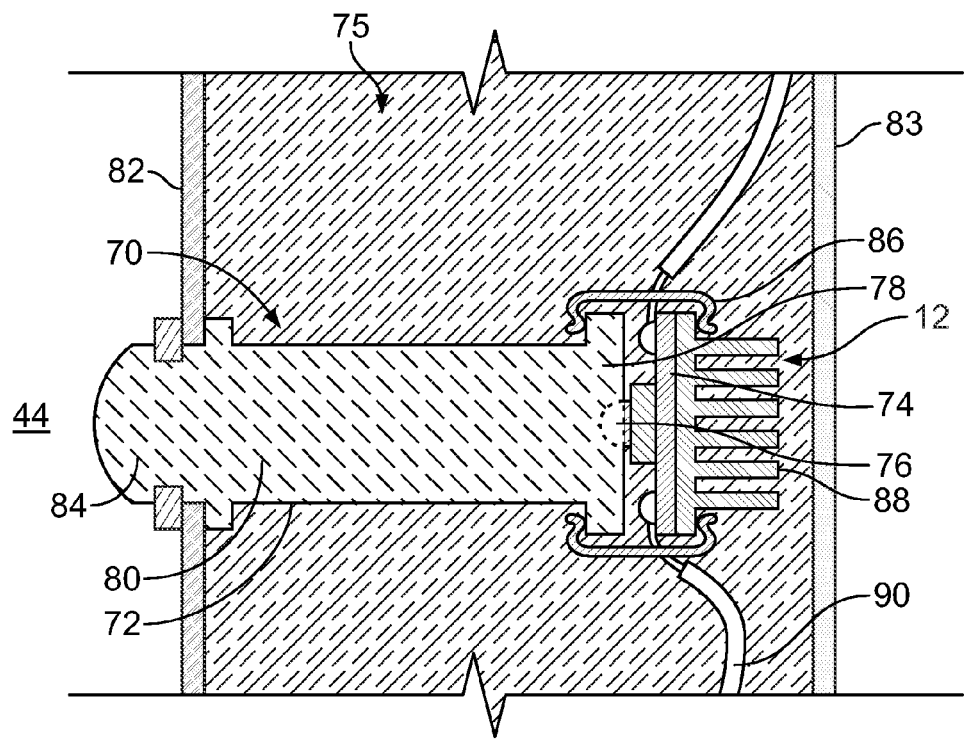
FIGS. 7 and 8 illustrate another alternate embodiment of an oven lighting fixture with an optical conduit.

Referring to FIG. 1, a light guide assembly 10 includes an LED assembly 12 mounted at either end of a light pipe 14. The light pipe 14 is constructed of a glass rod or tube and serves as an optical guide. The LED assembly 12 includes a finned heat sink 16 attached to the rear of an LED printed circuit board (PCB) (not shown). An exemplary LED assembly and related components (e.g., PCB, LED assembly 12 and heat sink 16) is described and illustrated in commonly owned U.S. Provisional Patent Application No.: 61/032,317 filed Feb. 28, 2008, entitled Integrated Led Driver For Led Socket, and the same is incorporated by reference herein. A frusto-conical cap portion 18 covers the LED PCB 74 (FIG. 7). The cap portion 18 has an aperture 20 at one end for axially receiving the light pipe 14 in line with an LED 76 (FIG. 7) mounted on LED PCB 74, configured such that the LED light emission is guided into an end of the light pipe 14. In one embodiment, the glass which forms the light pipe 14 may be formed of fused quartz or other similar material, provided that the light pipe 14 is optically clear or optically translucent. A reflector strip 22, indicated by the speckled region of the light pipe 14 in FIG. 1, is provided on or adjacent to a portion of the curved surface of the light pipe 14, for reflecting light emitted from the LED 76 perpendicular to the axis of the light pipe 14, e.g., towards a window or slot 40 (FIG. 4). While a single reflector strip 22 is shown, it will be understood that the light pipe 14 may include more than one reflector strip 22 disposed about the periphery of the light pipe 14. The reflector strip 22 may be applied, for example, as an external coating, co-extruded onto the light pipe 14, or integrally formed within the light pipe 14 as part of the manufacturing process. The reflector strip 22 may extend axially along a portion of the length of the light pipe 14, or the entire axial length of the light pipe 14, depending on the application. In the exemplary embodiment shown in FIG. 1, the length of the reflector strip 22 coincides approximately with the longitudinal dimension of a window 40, through which the light is dispersed. The function of the reflector strip 22 is to redirect dispersed light rays through window 40, into a cavity, e.g., an oven cavity 44 as shown in FIG. 6, on the opposite side of window 40 as the light guide assembly 10. The light pipe 14 may be inserted through a wall of the cavity 44, e.g., an oven, other types of high-temperature environment, corrosive or toxic atmosphere, or even tanks of liquid, in which lighting is desired, and which is not conducive for containing or operating an LED assembly 12.

Figure 2:
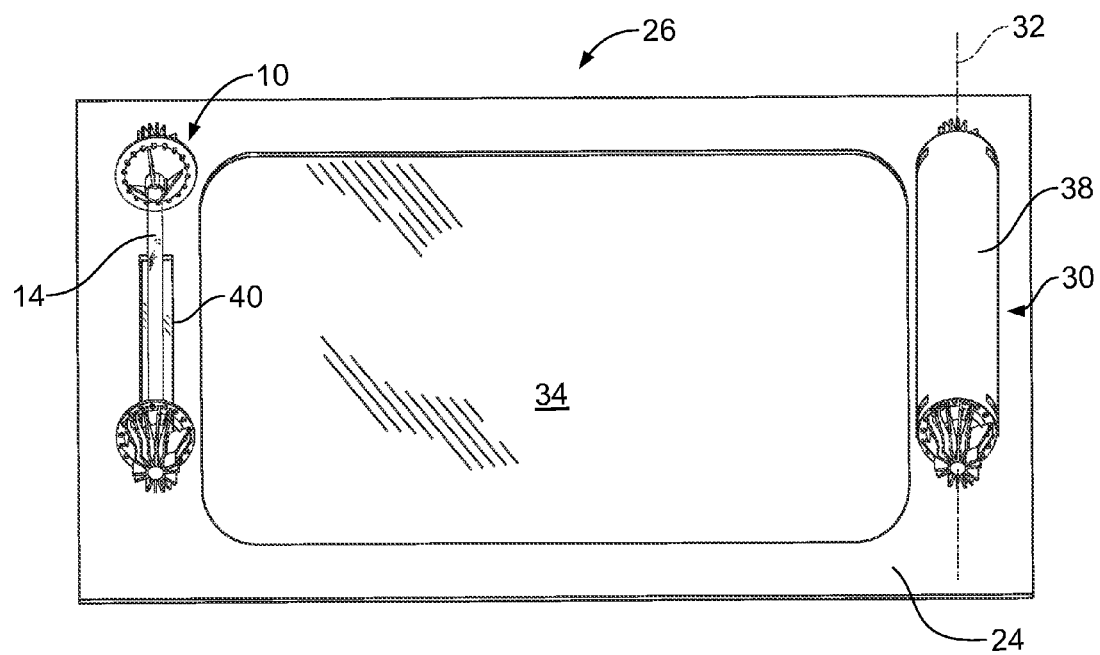
FIG. 2 is a perspective view of exemplary LED light fixtures mounted on an oven door panel.

In an exemplary embodiment shown in FIG. 2, the light guide assembly 10 is mounted on the reverse side 24 of an inner panel 26 of an oven door, i.e., opposite the forward side of the door panel 26, which is exposed to the interior of the oven cavity 44 (FIG. 6). A hollow, semi-cylindrical mounting bracket 30 partially surrounds the light pipe 14 along the longitudinal axis 32. The bracket 30 supports the light guide assembly 10 and has an opening (see FIG. 3) on one side which directs the light towards windows in the door panel 26, as will be explained presently. A light guide assembly 10 with bracket 30 removed is shown on the opposite side of the main oven window 34, to illustrate the arrangement of the light guide assembly 10 inside the bracket 30. The right sidelight window 40 (FIG. 4) on door panel 26 is concealed by the light guide assembly 10 and bracket 30. The sidelight windows 40 are transparent or translucent panels that transmit light produced by the light guide assembly 10 into the oven cavity 44.

Figure 3:
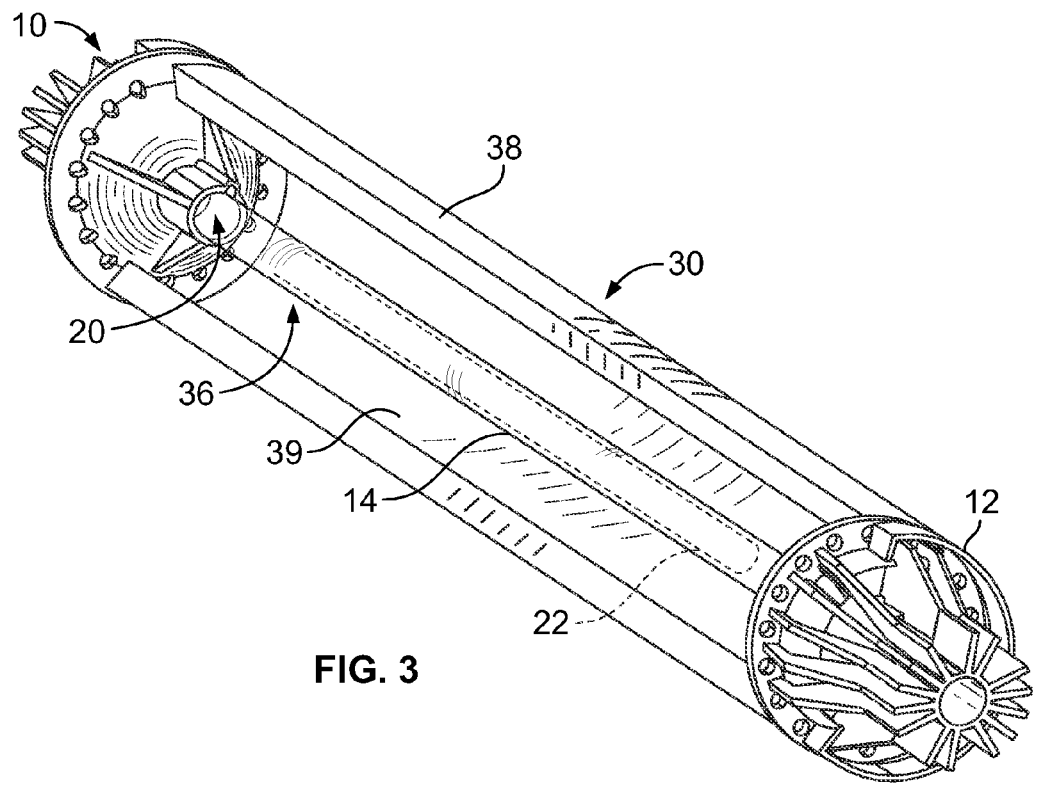
FIG. 3 is a perspective view of the mounting bracket containing an LED assembly.

Referring to FIG. 3, an enlarged view of the light guide assembly 10 attached to mounting bracket 30 shows an open slot 36 where the sidewall 38 is partially cut out of the mounting bracket 30. The mounting bracket 30 may be colored white on at least the interior surface 39 of the sidewall 38, to increase the reflection of light dispersed from light pipe 14 into the oven cavity 44. The mounting bracket 30 is attached to the reverse side 24 of the oven door panel 26, with the slot 36 facing the sidelight windows 40 (FIG. 4). The sidelight windows 40 may be positioned to the sides of, and/or above or below, the oven window 34. Alternately, the bracket 30 may be attached to the outer door panel (not shown), with the slot 36 directed toward the sidelight window(s) of the inner door panel 26.

The light guide assemblies 10 provide arrangements that easily mount into the oven door. The light guide assemblies 10 are positioned outside of the oven cavity 44, so they do not become contaminated with grease or food particles, and so there is no loss in the lighting performance as the oven interior accumulates grime and grease, assuming the windows are maintained clean. Straight configurations for the light guides 10 provide for maximum light transmission, with no light loss due to bends in the light pipe 14.

FIG. 4 shows a schematic arrangement of one embodiment of the oven door 26 interior panel, with LED windows 40 disposed above and below the main oven window 34. With the light guide assemblies 10 disposed between the inner and outer oven door panels in a sealed space, cooled or ambient air may be circulated over the assemblies 10 to maintain the operating temperature inside the door space at 125° C. or less, to meet the operational requirements of the LEDs. The heat sink 16 of the LED assembly 12 may similarly be attached to the outer oven panel 26 for additional cooling of the LED assembly 12.

Figure 5:
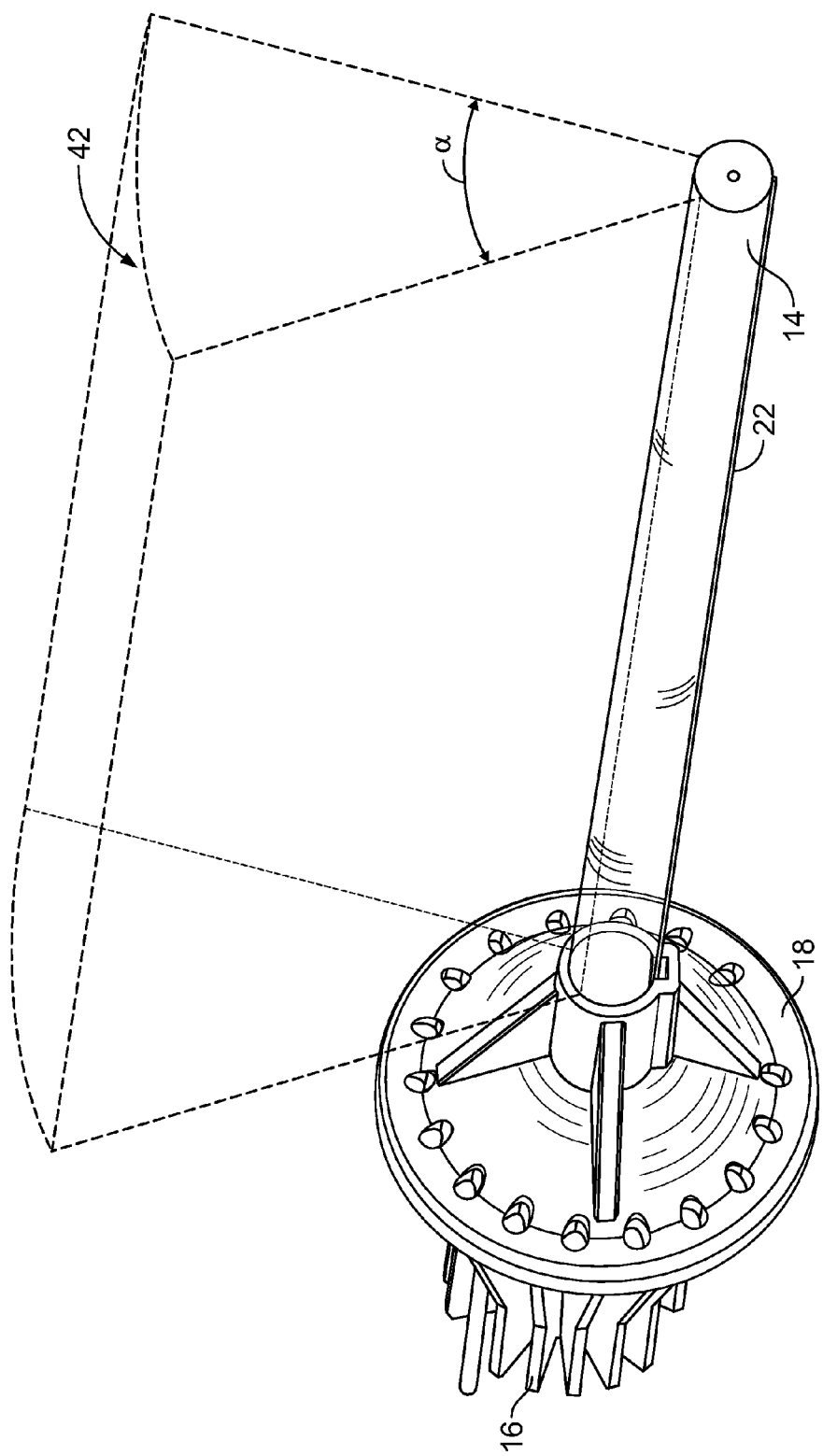
FIG. 5 is a perspective view of the light pipe illustrating the beam angle of the light pipe.

Referring next to FIG. 5, the light pipe 14 defines an angle α of the LED light beam 42 emitted from the light pipe 14. The angle α is determined by the position of the reflector strip 22 on the opposite side of the light pipe 14. The spread of the LED light beam 42, defined by angle α preferably coincides with the approximate width of the sidelight window 40 so as to maximize light transmission into the oven cavity 44.

Referring next to FIG. 6, an alternate embodiment shows a curved light guide assembly 10 with one LED assembly 12 affixed to each end of light pipe 14. Light pipe 14 is bent at 90° angle in two corners to extend along three sides of the internal periphery of oven cavity 44. In this configuration, the light guide assembly 10 is inserted up into the oven cavity 44 through openings in the oven cavity 44 floor 46, with the LED assemblies 12 positioned outside of the oven cavity 44. Alternately, the light pipe 14 may be inserted down into the oven cavity 44 through the ceiling 48. In another embodiment, LED assemblies 12 can be mounted on both ends of light pipe 14, as shown in FIG. 1, and the light pipe 14 passed through the oven cavity 44.

Figure 8:
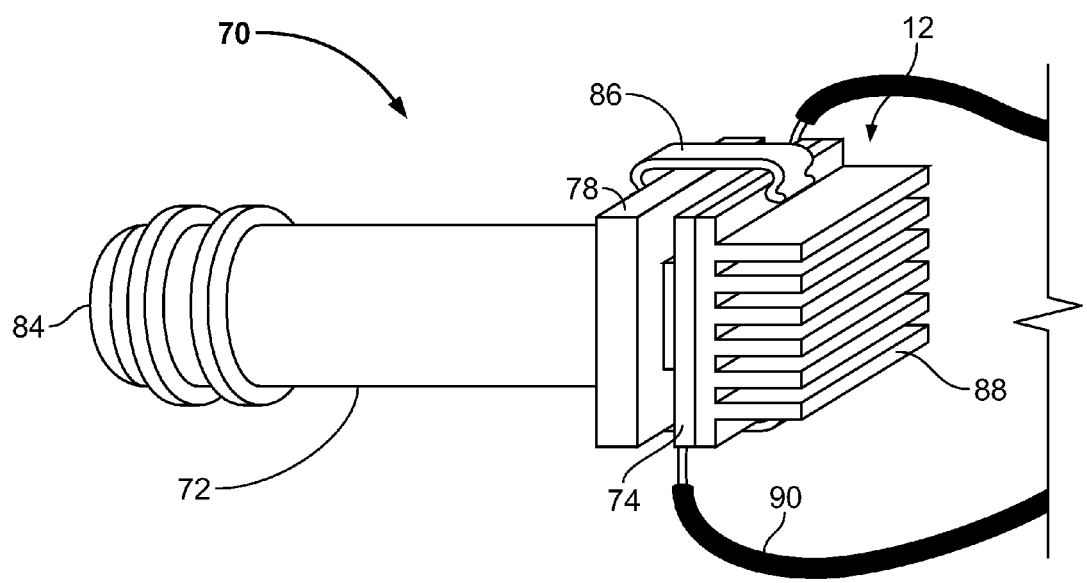

Referring next to FIGS. 7 and 8, another embodiment of an oven lighting fixture 70 includes an optical conduit 72. The optical conduit 72 is preferably formed of glass, fused quartz or other material having similar thermal isolation and optical characteristics, and may be annular or solid. The lighting fixture 70 has a printed circuit board 74 including an LED 76 mounted at a first end 78 of the optical conduit 72, and opposite the optical conduit second end 80 adjacent to the heated cavity 44 wall 82. The second end 80 includes a lens portion 84. The lens portion 84 may be concave or convex, depending on the desired dispersion pattern of the light beam. Further, the LED 76 may be equipped with special optics features to collimate the light projected through the optical conduit 72. The optical conduit 72 may be attached to the cavity wall 82 using a C-clip or other fastening device to ensure that the lens portion 84 protrudes into the oven cavity 44.

The LED PCB 74 is attached to the first end 78 using a fastener, e.g., spring clips, screws, or other fastening devices to maintain contact between the LED 76 optics and the first end 78. A spring clip 86 arrangement is shown in the example given in FIGS. 7 & 8. The PCB 74 may include an optional heat sink assembly 88 for additional heat dissipation capacity. Wire leads 90 provide power, e.g., from the oven power source, to energize the LED 76. This heat sink assembly 88 may be in thermal contact with the outer metal door skin 83 to further enhance thermal performance of the lighting fixture 70. Wire leads 90 are connected to the PCB 74 by conventional solder connection or other electrical termination devices.

The optical conduit 72 provides thermal separation between the oven cavity 44 and the LED assembly 12, and supports the LED assembly 12. Since glass has low thermal conductivity relative to other materials, the LED 76 and PCB 74 remain thermally isolated from the temperatures present on the wall 82 of the oven cavity 44, and are able to operate within the normal operating range of the LED 76. The optical conduit 72 is preferably surrounded by thermal insulation 75 of the oven over substantially the length of the optical conduit 72, to further minimize heat transfer from the oven cavity 44.

Figure 9:
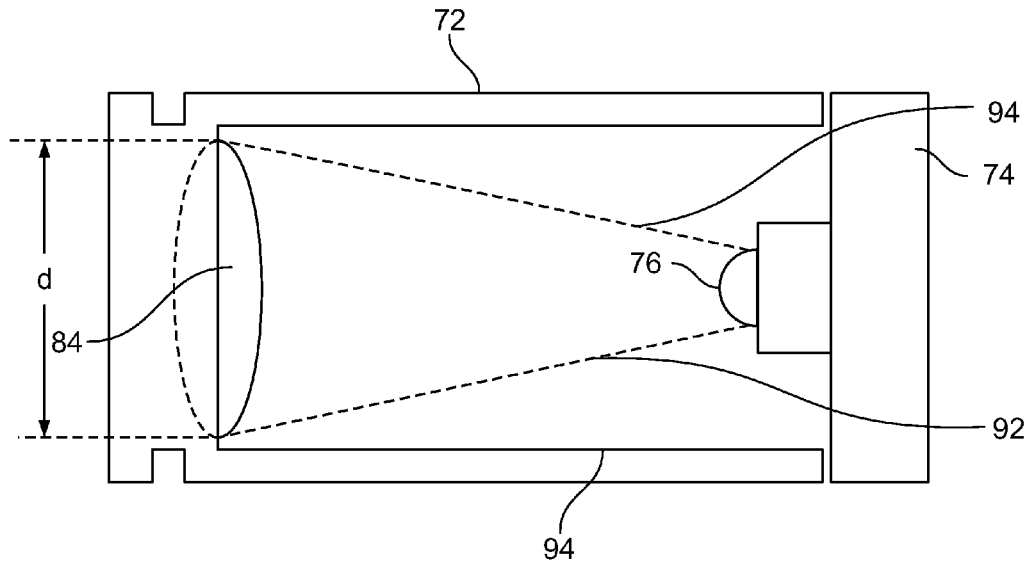
FIG. 9 illustrates the optical conduit with a hollow glass tube with a diameter d sized to accommodate the light output of the LED.

Referring next to FIG. 9, in one embodiment the optical conduit 72 is a hollow glass tube with a diameter d sufficient to accommodate the light output of the LED 76 and the required optical output. The length of the optical conduit 72 is selected based on the angular beam spread of the LED 76 used on the PCB 74, e.g., for an LED having a 20° beam spread, indicate by broken arrow lines 92, 94, the length of the optical conduit 72 will be determined so that the entire light output of the LED (or the desired proportion, if less than the entire light output) is projected through the lens portion 84, without reflection or diffusion of light through the sidewall 94 of the optical conduit 72.

Figure 10:
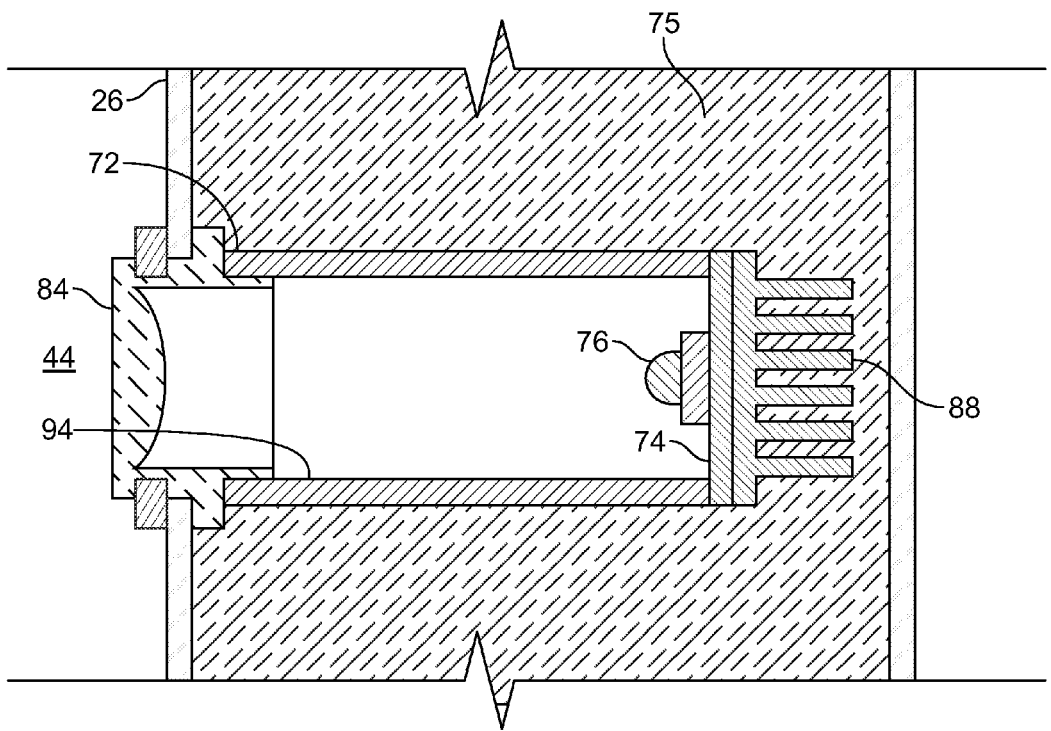
FIG. 10 is an embodiment of the optical conduit with a mirrored surface on interior sidewall

Referring next to FIG. 10, another embodiment of the optical conduit 72 includes a mirrored surface on interior sidewall 94. The reflectance of the mirror sidewall 94 provides negligible loss due to diffusion through the sidewall 94. The optics and lens designs are therefore less critical than other embodiments that have no mirrored surface.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the LED lighting fixtures as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

What is claimed is:

1. An LED type lighting fixture for illuminating an oven cavity comprising:
   at least one LED assembly optically coupled with an optical guide member, a mounting bracket and a pair of electrical leadwires to connect the LED lighting fixture to an external voltage source, the optical guide member comprising a light pipe, the light pipe comprising a reflective strip tangentially attached to an exterior surface of the light pipe for reflecting light in a predetermined direction;
   the at least one LED assembly comprising:
   an LED attached to a printed circuit board, and a finned heat sink for removing heat from the LED;
   wherein the mounting bracket is attachable to a planar surface adjacent to the oven cavity to support the LED lighting fixture adjacent to a sidelight window, the mounting bracket partially surrounding the lighting fixture and having a slot adjacent to the window for transmitting light from the LED through the light guide and into the oven cavity.

2. The lighting fixture of claim 1, wherein the LED assembly further includes a frusto-conical cap portion with an aperture at one end for receiving the optical guide, the frusto-conical cap portion configured to direct light emitted from the LED into the optical guide, and secure the optical guide to the LED axially in the mounting bracket.

3. The lighting fixture of claim 1, wherein the sidelight window is positioned adjacent to an oven main window.

4. The lighting fixture of claim 3, wherein the sidelight window positioned adjacent the oven main window at one of above, below and either side of the main oven window.

5. The lighting fixture of claim 1, wherein the planar surface is an interior panel of a two panel oven door, and the light fixture is attached to a side of the interior panel.

6. The lighting fixture of claim 1, further comprising the printed circuit board having ancillary circuitry for powering the LED.

* * * * *